Figure 1:
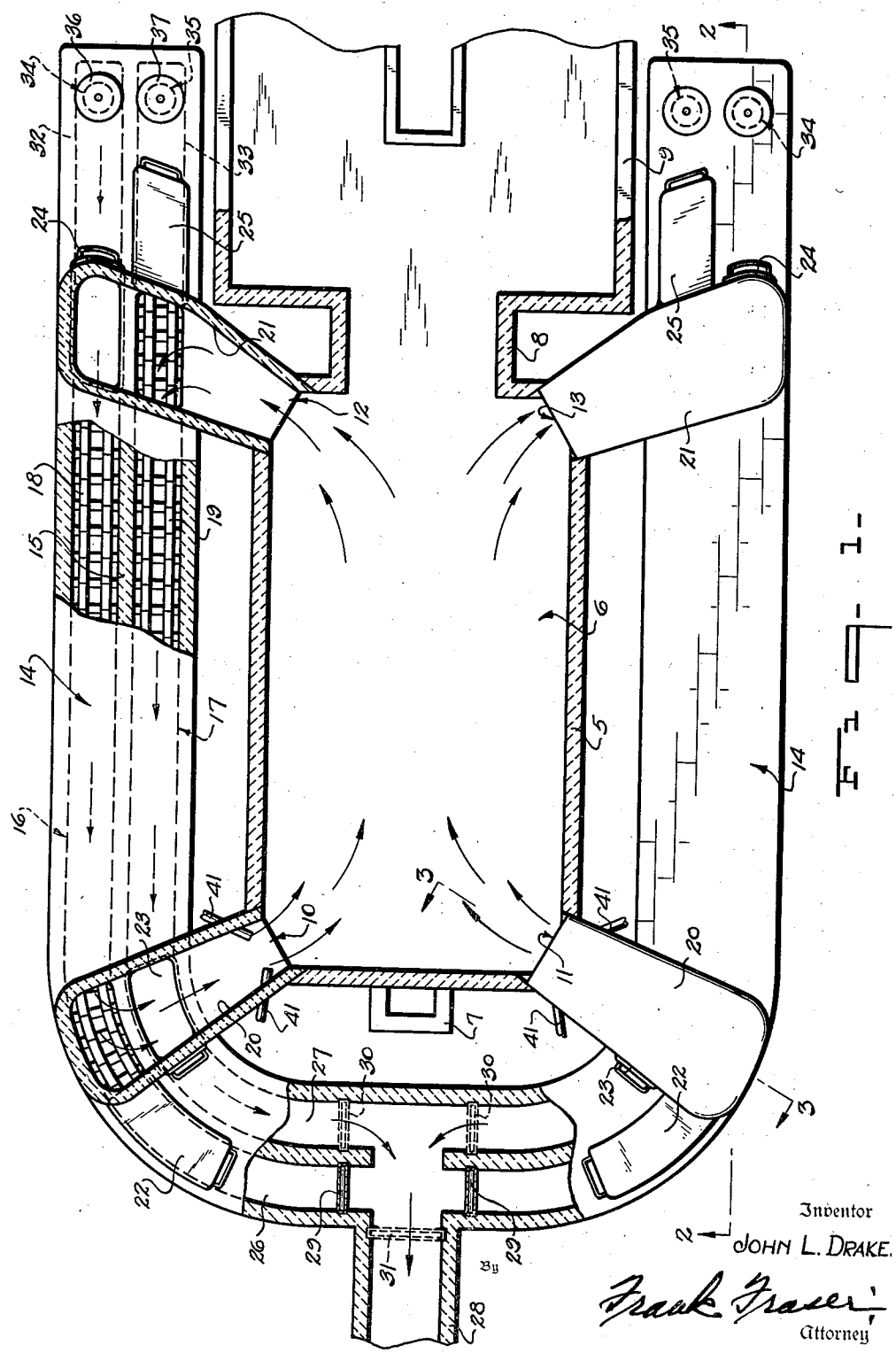

April 13, 1937. J. L. DRAKE 2,077,168
FURNACE
Filed June 19, 1933 3 Sheets-Sheet 1

Inventor
JOHN L. DRAKE.
By Frank Fraser
Attorney

April 13, 1937. J. L. DRAKE 2,077,168
FURNACE
Filed June 19, 1933 3 Sheets-Sheet 2

Inventor
JOHN L. DRAKE.
By Frank Fraser
Attorney

April 13, 1937.   J. L. DRAKE   2,077,168
FURNACE
Filed June 19, 1933   3 Sheets-Sheet 3

Inventor
JOHN L. DRAKE.
By Frank Fraser
Attorney

Patented Apr. 13, 1937

2,077,168

UNITED STATES PATENT OFFICE 2,077,168

FURNACE

John L. Drake, Toledo, Ohio, assignor to Libbey-Owens-Ford Glass Company, Toledo, Ohio, a corporation of Ohio Application June 19, 1933, Serial No. 676,514

8 Claims. (Cl. 49—54)

The present invention relates broadly to the art of heat treatment and more particularly to a novel and improved design of glass melting furnace.

In the regenerative type of furnaces commonly employed for the production of molten glass, a plurality of ports is arranged along each side of the melting end or tank, with means being provided for supplying the required gas and air thereto for combustion purposes. The gas is ordinarily supplied through one or more pipes adjacent the mouth of each port while the air is drawn through a checker-work which has been previously heated by the exhaust gases issuing from the furnace.

At regular intervals, usually about every twenty minutes, the firing operation is reversed; that is, the flame is stopped on one side of the furnace and started on the opposite side, so that the glass is heated from flames supplied alternately first from one side and then the other. The time consumed in reversing the firing operation is in the neighborhood of about a minute and during this time it will be manifest that conditions which have been set up and working nicely are rapidly changed. This constant changing of temperature conditions incident to the periodic reversal of the firing operation appears to be detrimental to the production of good glass.

The manufacture of glass in sheet form, as well as other glass articles, is practically a question of proper temperature control from the time the raw batch is introduced into the furnace until the glass has been formed into a sheet or other article and annealed. With the above type of furnace, the character of the flame and distribution thereof over the glass in the tank would not permit of the greatest efficiency either from the standpoint of fuel consumption or the quality of glass produced.

An important object of this invention, therefore, resides in the provision of a glass melting furnace of novel and improved construction designed to produce a more nearly uniform and better quality product.

Another important object of the invention is the provision of a furnace structure embodying means for applying heat to the glass batch in a manner to melt the same more efficiently and economically than heretofore and eliminate, as far as possible, undesirable rapid temperature changes in the molten glass being conditioned.

Another object of the invention is the provision of a glass melting furnace of simplified and practical construction wherein temperature conditions may be made more nearly uniform and which temperatures, after once being set up, may be maintained more constant.

Still another object of the invention is to provide a non-reversible glass melting furnace wherein the flame is caused to travel continuously in the same direction and preferably from the charging end of the melting tank to the discharging end thereof whereby the flame will flow in the same general direction as the flow of molten glass so as to obtain a maximum amount of heat at the charging end of the tank and a gradually decreasing amount toward the discharge end thereof.

Still another object of the invention is to provide a non-reversible type of glass melting furnace embodying a corner system of firing, assuring rapid and complete combustion of the gas and air resulting in maximum heat and turbulence of flame.

A still further object of the invention is to provide a non-reversible type of glass melting furnace embodying a system of corner firing in combination with a plurality of reversible means for substantially continuously and alternately supplying preheated air to the inlet ports without affecting the direction of travel of the flame.

Other objects and advantages of the invention will become more apparent during the course of the following description when taken in connection with the accompanying drawings.

Figure 2:
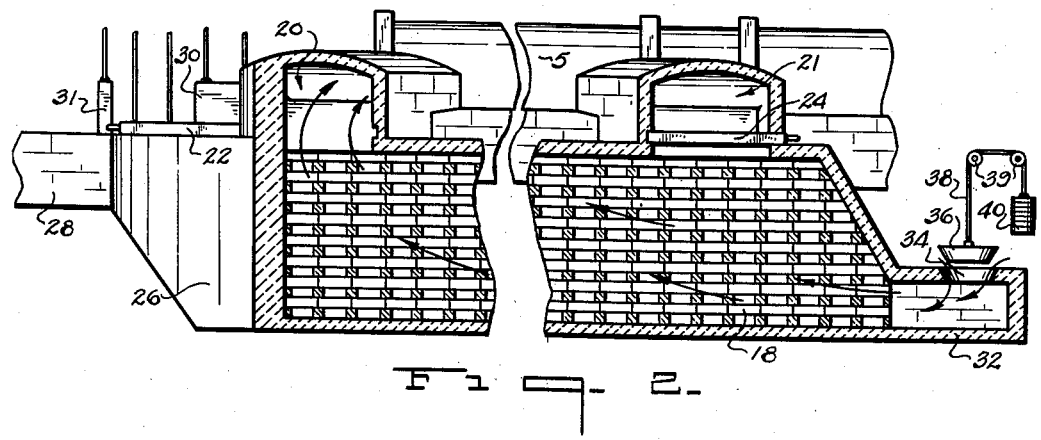
Figure 3:
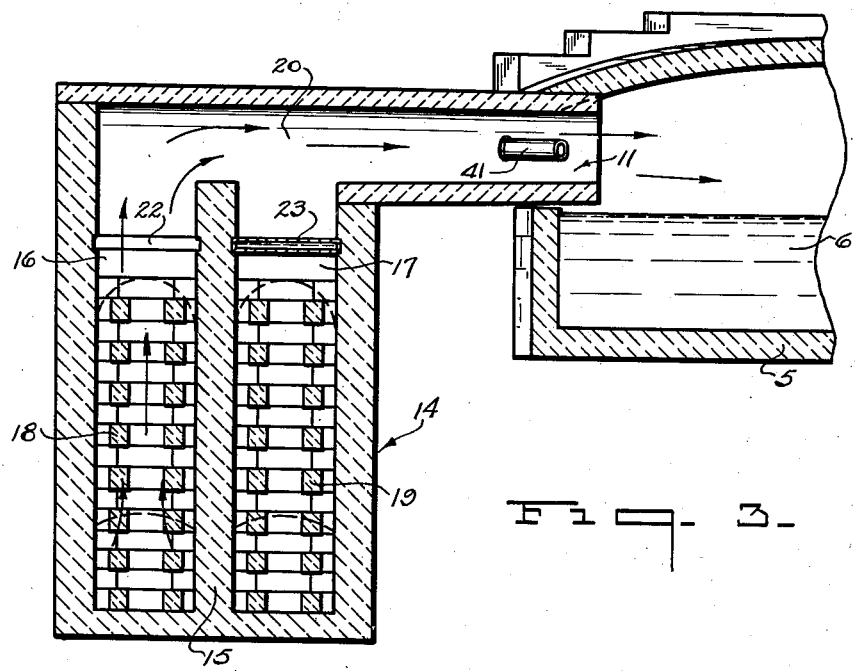
Figure 4:
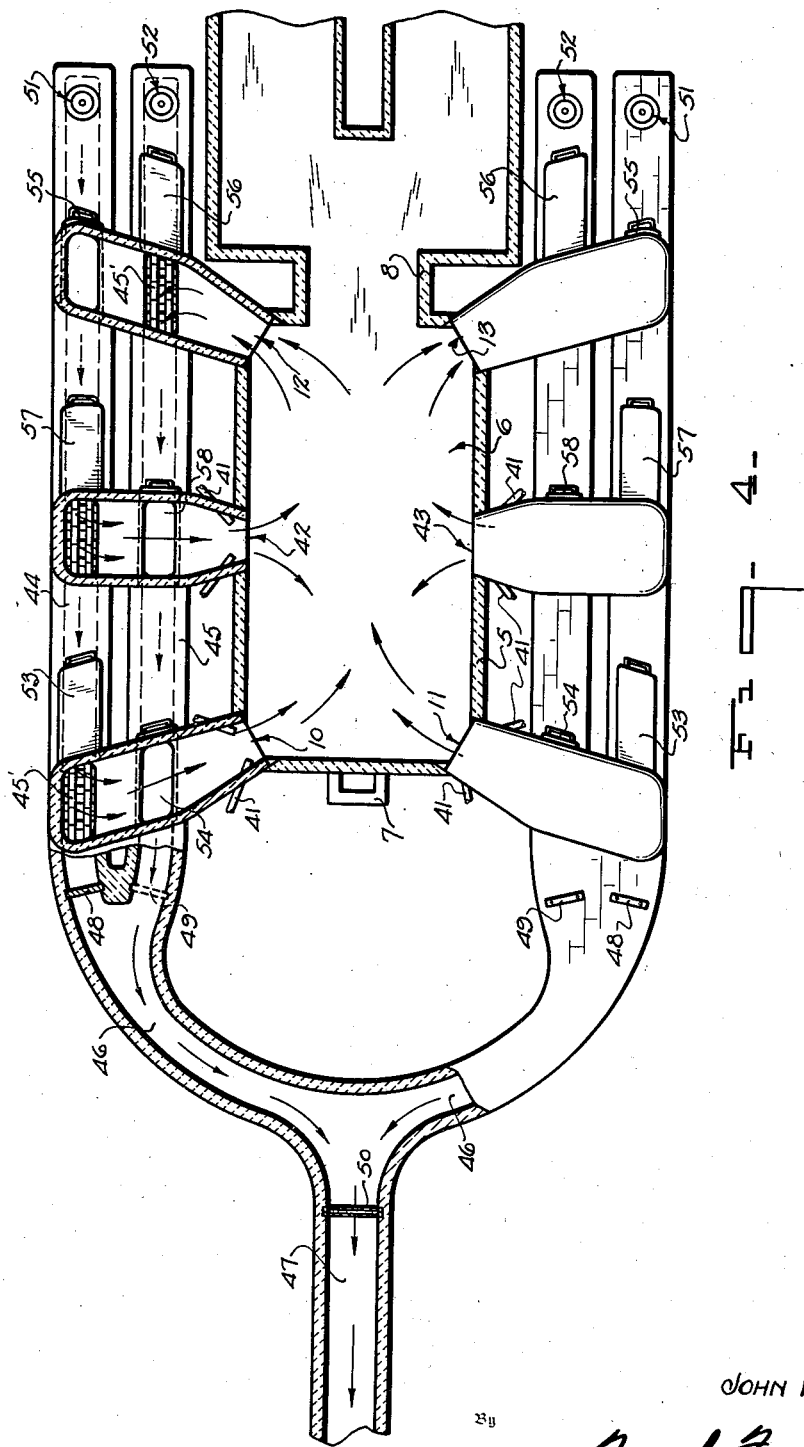

In the drawings wherein like numerals are employed to designate like parts throughout the same, Fig. 1 is a plan view, partially in section, of a furnace construction embodying the present invention, Fig. 2 is a section taken substantially on line 2—2 of Fig. 1, Fig. 3 is a section taken substantially on line 3—3 of Fig. 1, and Fig. 4 is a view similar to Fig. 1 but showing a somewhat modified arrangement.

Referring now to the drawings, and particularly to Figs. 1, 2 and 3, there is disclosed a furnace structure embodying a substantially rectangular melting tank 5 within which the glass batch is adapted to be melted to produce a mass of molten glass 6. The raw glass batch ingredients are introduced into the melting tank through a so-called doghouse 7 arranged at the charging end thereof, the batch being subjected within the said tank to the action of flames which causes the various ingredients to melt and combine so as to produce molten glass. The molten glass produced flows slowly to the right through a restricted opening or neck 8 into the refining tank 9 through which it then moves to the point of working. As the molten glass is continuously or substantially continuously drawn off at the working end of the furnace, the body of molten glass 6 gradually moves toward this end so as to set up a substantially continuous flow of glass through the melting tank.

Inasmuch as the present invention does not concern the specific construction of the working end of the furnace, such end has not been illustrated in the drawings, but may be of any conventional or preferred construction. Likewise, the molten glass may be removed from the furnace in the form of a continuous sheet or worked into other glass articles as desired.

The melting tank 5 is provided at the four corners thereof with the angularly disposed ports 10, 11, 12 and 13 respectively, the ports 10 and 11 constituting the inlet ports, while the ports 12 and 13 constitute the outlet ports. Thus, the flames are introduced into the furnace through the ports 10 and 11 while the products of combustion are carried away through the ports 12 and 13. The flames are adapted to issue from the inlet ports simultaneously and continuously.

The inlet ports are so disposed that the flames will be projected into the melting tank diagonally thereof or, in other words, at an acute angle with respect to the side walls thereof. The flames thus projected into the tank are then caused to travel longitudinally thereof and be withdrawn through the ports 12 and 13, as shown by the arrows in Fig. 1. The gas and air for combustion purposes are supplied to the ports 10 and 11 in a manner to be more fully hereinafter described.

By introducing the flames into the melting tank in the manner above described, a maximum amount of heat may be obtained with great turbulence or violent agitation of flame, thereby assuring rapid and complete combustion of the gas and air and resulting in a more thorough and efficient heating of the batch. The flames flow continuously in the same general direction as the flow of molten glass so that a maximum amount of heat is had at the charging end of the tank and a gradually decreasing amount toward the discharge end thereof due to the fact that the flames gradually lose heat as they become further removed from the inlet ports. However, a better distribution of the fuel with consequent uniform heating of the glass is obtained. Due to the fact that the flames travel continuously in the same direction through the tank, it is possible, after having once set up satisfactory conditions, to maintain such conditions more constant and in this way eliminate undesirable rapid temperature changes in the molten glass being conditioned.

In accordance with this invention, although the flames travel continuously in the same direction, reversible regenerative means is provided for supplying preheated air to the inlet ports so that the exhaust gases may be used to preheat the incoming air. To this end, there is arranged along each side of the melting tank 5 a longitudinally extending housing 14 having a central vertical longitudinally extending partition wall 15 therein which divides the interior thereof into two individual checker-chambers 16 and 17 within which are arranged the customary brick checker-works 18 and 19 respectively. The checker-chambers at each side of the tank communicate at their upper ends with a common horizontal passage 20 which leads to the intake port 10 or 11 and also open into a second common horizontal passage 21 which communicates with the exhaust port 12 or 13.

Arranged within the checker-chambers 16 and 17 above the checker-works 18 and 19 are the horizontally slidable dampers 22 and 23 respectively which are provided to control the flow of preheated air to the inlet port. Similar horizontally slidable dampers 24 and 25 are provided to control the passage of the products of combustion or burnt gases from the passage 21 to the desired checker-chamber 16 or 17.

Leading from one end of the checker-chambers 16 and 17, at each side of the melting tank, are tunnels 26 and 27 respectively which communicate at their outer ends with a flue 28 running to a stack (not shown). Arranged within the tunnels 26 and 27, adjacent flue 28, are the vertically slidable dampers 29 and 30, while disposed within flue 28 is a damper 31.

The opposite ends of the checker-chambers 16 and 17 are provided with reduced extensions 32 and 33 having air intake openings 34 and 35 respectively controlled by the valve members 36 and 37. Each valve member is carried at one end of a cable 38 passing upwardly over pulleys 39 and having secured to its opposite end a counterweight 40.

The gas may be supplied to each inlet port 10 and 11 through one or more pipes 41 which are adapted to deliver the gas into the passage 20 closely adjacent the mouth of said port.

As set forth above, in the operation of the furnace, the flames are adapted to travel continuously in the same direction through the melting tank, being introduced thereinto through the ports 10 and 11, with the burnt gases being carried off through the ports 12 and 13. Also, that reversible means is provided for alternately supplying air to the inlet ports so that the exhaust gases may be used to preheat the incoming air. As shown in Fig. 1 of the drawings, fresh air is being drawn in through the checker-chambers 16 at opposite sides of the tank while the products of combustion are being carried off through the checker-chambers 17.

When the furnace is operating in this manner, the dampers 22, 25, 30 and 31 are open while the dampers 23, 24 and 29 are closed. Likewise, the air intakes 34 are open while the air intakes 35 are closed. The fresh air will then enter through the intakes 34 and, after traveling longitudinally through the checker-chambers 16, will pass upwardly therethrough into the passages 20 and thence to the inlet ports 10 and 11 where it will be combined with the gas introduced through the pipes 41 to produce a flame. The products of combustion are withdrawn through the ports 12 and 13, and due to the fact that the dampers 24 are closed while the dampers 25 are open, the burnt gases will be directed into the checker-chambers 17 and caused to flow longitudinally thereof and thence outwardly through tunnels 27 to the flue 28. During the passage of the exhaust gases through checker-chambers 17, the checker-works 19 will be heated so that when the air supply is reversed and the air drawn in through checker-chambers 17, it will be preheated as it passes therethrough to the inlet ports.

After a desired interval of time, the dampers 22, 25 and 30 are closed, while the dampers 23, 24 and 29 are opened, with the damper 31 remaining open. The air intakes 34 are also closed and the air intakes 35 opened. The fresh air will now enter through intakes 35 and pass longitudinally through the checker-chambers 17 and thence through passages 20 to the inlet ports.

The burnt gases, being withdrawn through the exhaust ports, will be caused to travel longitudinally through the checker-chambers 16 and outwardly thereof through tunnels 26 to flue 28. Thus, by proper adjustment of the dampers 22, 23, 24 and 25, either checker-chamber 16 or 17 may be placed in communication with either the inlet port or the outlet port. From the above, it will be seen that means has been provided for substantially continuously and alternately supplying preheated air to each inlet port from a plurality of air supplies without affecting the direction of travel of the flames or without any apparent interruption to the flames issuing from the said inlet ports.

In Fig. 4 of the drawings, there is illustrated a somewhat modified furnace construction embodying the principles of the present invention. This furnace structure also includes a substantially rectangular melting tank 5 provided at the four corners thereof with the angularly disposed ports 10, 11, 12 and 13 respectively, the ports 10 and 11 being the inlet ports and the ports 12 and 13 the outlet ports. There are also provided intermediate the ends of the tank, the opposed auxiliary intake ports 42 and 43 and, in the operation of the furnace, flames are adapted to issue into the tank simultaneously and continuously from these auxiliary ports as well as from the ports 10 and 11. The introduction of additional flames into the tank through the auxiliary ports 42 and 43 will cause an even more turbulent flame action and result in the violent agitation and thorough mixing and intermingling of the fuel.

Extending longitudinally along each side of the melting tank are the individual checker-chambers 44 and 45 respectively, each containing a suitable checker-work 45'. The checker-chambers at each side of the tank communicate at one end with a single conduit 46 leading to a flue 47 having connection with a stack (not shown). Arranged within the checker-chambers 44 and 45, adjacent conduit 46, are dampers 48 and 49 respectively, while a damper 50 is arranged in flue 47. The checker-chambers 45 and 46 are also provided at their opposite ends with the air intakes 51 and 53 respectively.

The passage of fresh air from the checker-chambers 44 and 45 to the ports 10 and 11 is controlled by horizontally slidable dampers 53 and 54 respectively, while the passage of the burnt gases through outlet ports 12 and 13 to the checker-chambers is controlled by dampers 55 and 56. Similar dampers 57 and 58 are provided to control the flow of fresh air from the checker-chambers to ports 42 and 43. Inasmuch as the operation of this modified furnace structure is the same as that described hereinabove, it is not believed necessary to set forth a detailed description thereof. However, it will be understood that fresh air is first adapted to be drawn in through the checker-chambers 44 while the products of combustion are passed outwardly through checker-chambers 45. After a certain period of time, the air supply is reversed so that fresh air will be drawn in through checker-chambers 45, with the burnt gases passing outwardly through checker-chambers 44.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A glass melting furnace including a substantially rectangular melting tank and a regenerative corner system of firing associated therewith in which the flames travel continuously in the same direction.

2. A glass melting furnace including a substantially rectangular melting tank and a non-reversible regenerative corner system of firing associated therewith in which the flames travel continuously in the same direction.

3. A glass melting furnace including a substantially rectangular melting tank having ports in the corners thereof, means for feeding gas and air to certain of the ports, and means for withdrawing the products of combustion from other of said ports, the inlet ports being arranged to project the flames into the tank diagonally thereof.

4. A glass melting furnace including a substantially rectangular melting tank having ports arranged in the four corners thereof, means for continuously feeding gas and air to the ports at one end of the tank, and means for continuously withdrawing the products of combustion through the ports at the opposite end thereof, the inlet ports being arranged to project the flames into the tank diagonally thereof.

5. A glass melting furnace including a substantially rectangular melting tank having a charging end and a discharging end, ports arranged in the four corners thereof, means for continuously feeding gas and air to the ports at the charging end of the tank, and means for continuously withdrawing the products of combustion through the ports at the discharging end thereof, the inlet ports being arranged to project the flames into the tank diagonally thereof.

6. A glass melting furnace including a substantially rectangular melting tank having ports disposed diagonally across the four corners thereof, means for feeding gas and air to certain of the ports, and means for withdrawing the products of combustion from other of said ports.

7. A glass melting furnace including a substantially rectangular melting tank having ports disposed diagonally across the four corners thereof, means for continuously feeding gas and air to the ports at one end of the tank, and means for continuously withdrawing the products of combustion through the ports at the opposite end thereof.

8. A glass melting furnace including a substantially rectangular melting tank having ports disposed diagonally across the four corners thereof, means for continuously feeding gas and air to the ports at the charging end of the tank, and means for continuously withdrawing the products of combustion through the ports at the discharging end thereof.

JOHN L. DRAKE.